(12) United States Patent
Biswas (10) Patent No.: US 9,341,731 B2
(45) Date of Patent: May 17, 2016

(54) FRACTURE DETECTION USING MONOPOLE SOURCE IN ACOUSTIC WELL LOGGING

(71) Applicant: Partha Bijoy Biswas, Sugar Land, TX (US)

(72) Inventor: Partha Bijoy Biswas, Sugar Land, TX (US)

(73) Assignee: GeoBiz Technology Inc., Sugar Land, TX (US)

( * ) Notice: Subject to any disclaimer, the term of this patent is extended or adjusted under 35 U.S.C. 154(b) by 144 days.

(21) Appl. No.: 14/155,247

(22) Filed: Jan. 14, 2014

(65) Prior Publication Data

US 2014/0324355 A1   Oct. 30, 2014

Related U.S. Application Data

(60) Provisional application No. 61/816,992, filed on Apr. 29, 2013.

(51) Int. Cl.
*G01V 1/30* (2006.01)
*G01V 1/50* (2006.01)

(52) U.S. Cl.
CPC ............ *G01V 1/50* (2013.01); *G01V 2210/626* (2013.01); *G01V 2210/646* (2013.01)

(58) Field of Classification Search
CPC ............ G01V 1/30; G01V 1/40; G01V 1/50; G01V 2210/10; G01V 2210/646; E21B 47/02208; E21B 47/091; E21B 47/101; E21B 47/14; E21B 43/26; A01K 97/08; A01K 97/06
See application file for complete search history.

(56) References Cited

U.S. PATENT DOCUMENTS

| | | | |
|---|---|---|---|
| 5,010,527 A * | 4/1991 | Mahrer | 367/86 |
| 6,614,360 B1 * | 9/2003 | Leggett et al. | 340/853.1 |
| 7,623,412 B2 * | 11/2009 | Pabon et al. | 367/75 |
| 7,652,950 B2 * | 1/2010 | Sinha et al. | 367/31 |
| 8,547,788 B2 * | 10/2013 | Wang et al. | 367/25 |
| 9,063,251 B2 * | 6/2015 | Moos | |
| 2012/0092958 A1 * | 4/2012 | Biswas | 367/31 |
| 2013/0081804 A1 * | 4/2013 | Sinha et al. | 166/250.01 |
| 2014/0010045 A1 * | 1/2014 | Bennett et al. | 367/31 |
| 2014/0192619 A1 * | 7/2014 | Sinha et al. | 367/35 |
| 2015/0049585 A1 * | 2/2015 | Collins | G01V 1/50 367/35 |

* cited by examiner

*Primary Examiner* — Michael Zarroli
(74) *Attorney, Agent, or Firm* — Craige Thompson; Thompson Patent Law (57) ABSTRACT

The present disclosure relates generally to well logging and measurement in subterranean formations and more particularly, the present disclosure relates to a system and method for identifying anisotropic formations, such as fractures and fracture patterns, in subterranean formations. The method uses waveforms transmitted from a monopole source. After finding the Root Mean Square energy from at least four quadrants, the energy data is normalized. At least one minimum RMS energy point is identified and the azimuth of that minimum is also identified. The azimuth and the minimum are instructive in defining fracture patterns and characteristics.

19 Claims, 11 Drawing Sheets

FRACTURE DETECTION USING MONOPOLE SOURCE IN ACOUSTIC WELL LOGGING

CROSS REFERENCE TO RELATED APPLICATIONS

The present disclosure claims priority to provisional patent application 61/816,992.

BACKGROUND

The present disclosure relates generally to well logging and measurement in subterranean formations and more particularly, the present disclosure relates to a system and method for identifying anisotropic formations, such as fractures and fracture patterns, in subterranean formations.

Acoustic well-logging may be used to determine fracture patterns or anomalies in subterranean formations. Orthogonal acoustic wave propagation and its polarization are used to determine fracture direction—also known as "seismic anisotropy." Industry professionals may use this information for hydrocarbon or mineral extraction, for instance and while fractures can indicate hydrocarbon or mineral deposits, not all anisotropic formations function as indicators of deposits. Furthermore, fracture direction may provide essential information on the direction and extent of drilling for extraction of materials from subterranean formations.

Historically, seismic anisotropy technology used refraction of compressional wave propagation to determine the azimuth of the fracture. The compressional wave would refract in a chevron pattern when hitting an anisotropic subterranean formation. The refraction, however, occurs when encountering any anisotropic formation, not just fracture-related anisotropic formations. Furthermore, the historical method relies on wavelength for finding the fracture. The wavelength of compressional waves is considered "long"—it is often referred to as a "slow wave"—thereby limiting the size of the fracture or anisotropic formation detectable to larger fractures. Due to the ambiguity and the lack of precision available from use of the historical method, it was abandoned for newer technology.

Currently, seismic anisotropy technology uses a method that interprets shear wave propagation to determine the azimuth of the fracture. In anisotropic formations, shear waves split into fast and slow components that move in orthogonal directions. The difference between the fast and slow components indicates the degree of anisotropy. Fractures are anisotropic, so shear wave splitting can be an indication of fractures in subterranean formations; however, not all anisotropic formations are fractures. Therefore, use of shear wave anisotropy is not so much a definitive indicator of fractures, but a definitive indicator of anisotropic formations that may be fractures but may be alternative anisotropic, or seemingly anisotropic, formations. This demonstrates some key limitations to the use of shear wave anisotropy that are becoming more pronounced as hydrocarbon extraction involves more anomalous and tighter subterranean formations. Furthermore, fractures, though anisotropic, can also exist in mildly anisotropic formations that cannot be detected by the present-day methods, as it is difficult to distinguish the subtle fracture patterns from the surrounding anisotropic media using shear waves.

In situations where energy mapping from shear wave anisotropy fails to distinguish between surrounding rock formations or where a redundant method to verify the shear wave results is asked for, shear sonic imaging is sometimes used to identify anisotropic formations in surrounding subterranean formations. The imaging technology relies on a difference of resistivity between the fluid in the well bore and the surrounding rock formations. The larger the difference in resistivity, the clearer the image produced should be. With softer rock formations, such as shale, the resistivity between the rock and the fluid in the well bore is not significantly different. Therefore, the current imaging software may not be able to provide clear pictures of anisotropic formations when used on soft rock formations.

Due to the drawbacks of the current and past methods, there still exists a need in the market for a method or technology to address these concerns and to improve the overall efficiency of fracture identification in subterranean formations.

SUMMARY

The present disclosure provides a method for identifying characteristics of subterranean formations that could increase the efficiency of and lessen the environmental impact of hydrocarbon extraction. One embodiment of the present disclosure can be a computer program with a multitude of steps that allow the user to identify characteristics of subterranean formations, such as fracture patterns and the direction of the fracture or fractures found. An alternative embodiment could simply be a set of steps and calculations leading to the identification of characteristics of subterranean formations, such as fractures or fracture patterns and the directions of those fractures. However, these embodiments should not be construed as limitations on the scope of any embodiment, but as exemplifications of various embodiments thereof. Many other variations are possible within the teachings of the various embodiments. Thus, the scope should be determined by the appended claims and their equivalents, and not by the examples given.

BRIEF DESCRIPTION OF FIGURES

The following detailed description of embodiments of the invention will be better understood when read in conjunction with the accompanying drawings. For the purpose of illustrating the invention, there is shown in the drawings, embodiments which are presently preferred. In the drawings, the left-most digit(s) of a reference number indicates the drawing in which the reference number first appears. The same reference numbers have been used throughout the drawings to indicate similar elements of the drawings.

DETAILED DESCRIPTION

For a thorough understanding of the present disclosure, reference is to be made to the following detailed description in connection with the above-mentioned drawings. Although the present disclosure is described in connection with exemplary embodiment, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the present disclosure. Further, it will nevertheless be understood that no limitation in the scope of the disclosure is thereby intended, such alterations and further modifications in the figures and such further applications of the principles of the disclosure as illustrated therein being contemplated as would normally occur to one skilled in the art to which the disclosure relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the disclosure. Furthermore, the appearances of such phrase at various places herein are not necessarily all referring to the same embodiment. The terms "a" and "an" herein do not denote a limitation of quantity, but rather denote the presence of at least one of the referenced item.

The present disclosure provides a method for finding fractures or fracture patterns in subterranean formations that takes full advantage of the sensitivity of modern technology and creates an opportunity for more effective, efficient, and less expensive hydrocarbon extraction. For illustrative purposes, the present disclosure will solely speak to hydrocarbon extraction. The extraction of hydrocarbons from subsurface formations commences by drilling a borehole through the earth to a target depth considered to be hydrocarbon bearing. Finding and producing hydrocarbons efficiently and effectively requires understanding the characteristics of the geologic properties of subterranean formations. The more accurate the information about the anisotropic formations, the more accurately drilling for hydrocarbon extraction can occur. It provides information on scope of the area of extraction operations, the direction of extraction operations, it could lower costs of the operation, and it could create less environmental exposure to chemicals. Mainly three measurements—electromagnetic, nuclear and acoustic—have been devised to achieve this end. The present disclosure relates to acoustic, or sonic, wave measurements.

Figure 1:
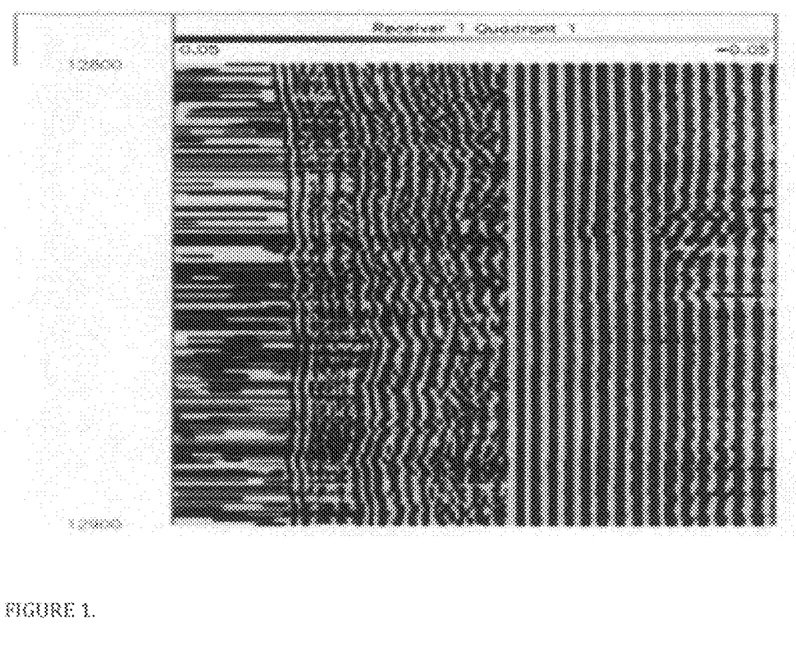
FIG. 1 illustrates a raw monopole waveform data from a receiver 1 in Quadrant 1, in accordance with an embodiment of the present invention.

Acoustic waves may be transmitted or propagated by several ways, but are mainly propagated using monopole or dipole sources. The propagated waves can be received, or logged, using a multitude of receivers located in four quadrants. The data received is considered to be raw acoustic data—raw because it has not yet been processed. FIG. 1 shows an example of raw monopole waveform data. In FIG. 1 the waveforms show reasonable leading noise; in particular, the waveforms shown deteriorate after two cycles. The leading noise should be eliminated to properly process the signal, but may sometimes be partially retained to ensure a large enough sample of data. The point of deterioration should be zeroed in later processing steps. After receipt of the raw data, processing or subsequent computations can occur.

Figure 2:
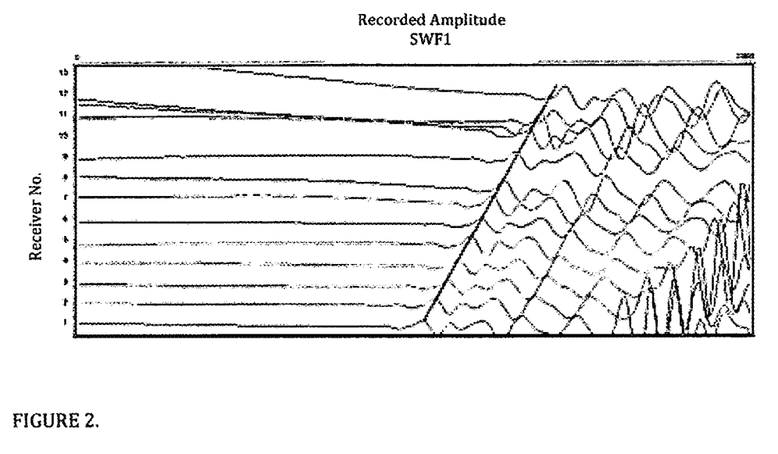
FIG. 2 illustrates an example of receiver move outs from receiver 1 in Quadrant 1, in accordance with the embodiment of the present invention.

As mentioned, more than one receiver logs the raw data for processing. These receivers are placed at a variety of distances from the monopole source. FIG. 2 shows an example of the monopole waveform recorded at different distances from the source—also known as the "move-out." Some receivers may fall out of phase for any variety of reasons, including tool shock or lack of maintenance. Specifically in FIG. 2, receivers 11, 12, and 13 show waveforms not in phase with the remainder of receivers. Using all of the receivers' data for processing anisotropy could lead to errors because the out of phase receivers could distort your image. Therefore, processing should use the in-phase receivers for subsequent processing steps.

Figure 3:
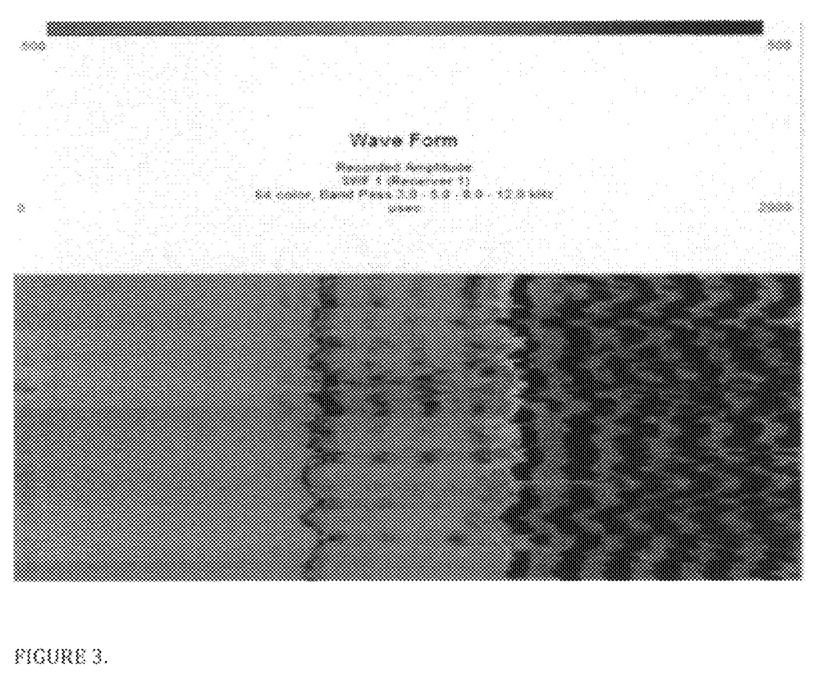
FIG. 3 illustrates the receiver data shown in FIG. 1, tracked it in time, in accordance with the embodiment of the present invention.

FIG. 3 shows the same receiver data as seen in FIG. 1, but tracked in time. In this step, some of the noisy data was retained to ensure that enough data points—a large enough sample—were kept to compute the Root Mean Square (RMS) energy. Some of the noise can be cleaned up in the frequency domain as a filtering step or it may be necessary to redo the processing steps eliminating all noisy data if the results do not align with expected results.

Figure 4:
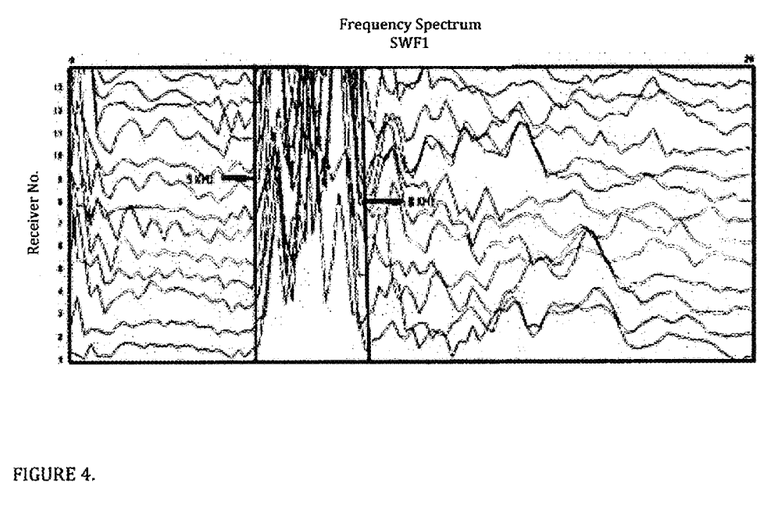
FIG. 4 illustrates a frequency of spectrum of raw monopole waveform, in accordance with the embodiment of the present invention.
Figure 5:
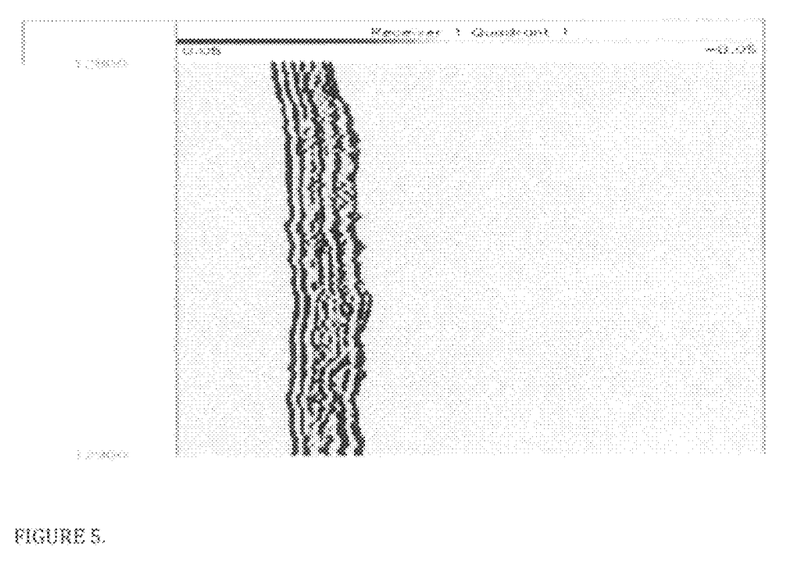
FIG. 5 illustrates the monopole data muted in time and frequency filtered, in accordance with the embodiment of the present invention.

After tracking the raw data in time, the frequency of the raw monopole waveform is calculated using a Fourier transform. An example of the result of a frequency calculation is shown in FIG. 4. The results help to determine the parameters for frequency filtering because the remaining processing steps can be focused on the area where the energy is concentrated. In FIG. 4, the majority of the energy is between 5-8 kHz so subsequent processing steps would only use data from between those parameters in that example. The data points outside of the determined parameters are filtered out of the frequency domain. The filtered waveforms are converted back to a time series using a reverse Fourier transform. FIG. 5 shows the data now that it has been filtered and converted back into a time series—also known as data muted in the time and frequency domains.

Figure 6:
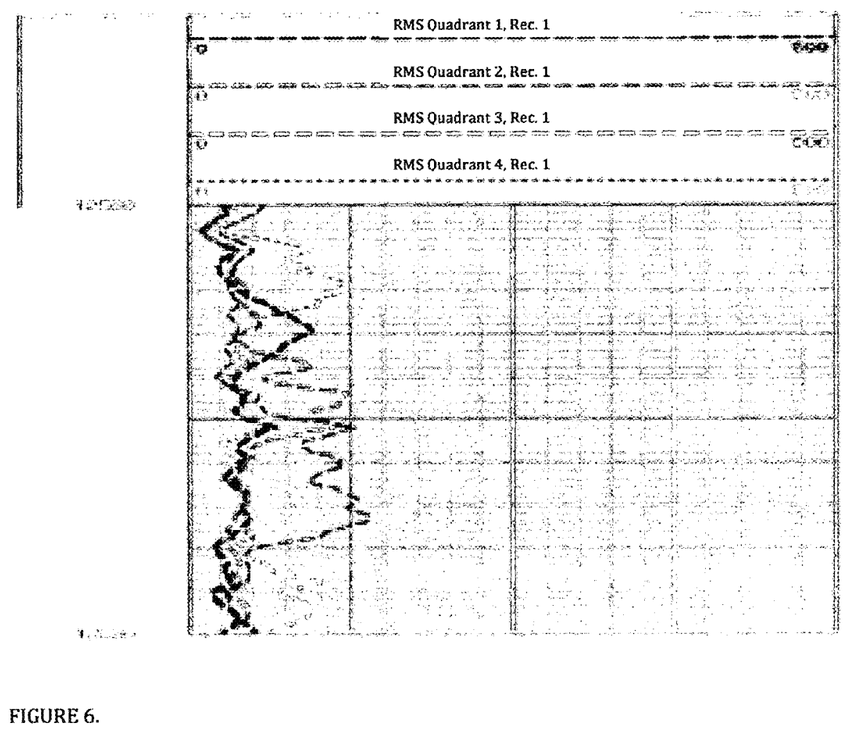
FIG. 6 illustrates Raw RMS Energy Output from Receivers in Quadrants 1-4, in accordance with the embodiment of the present invention.
Figure 7:
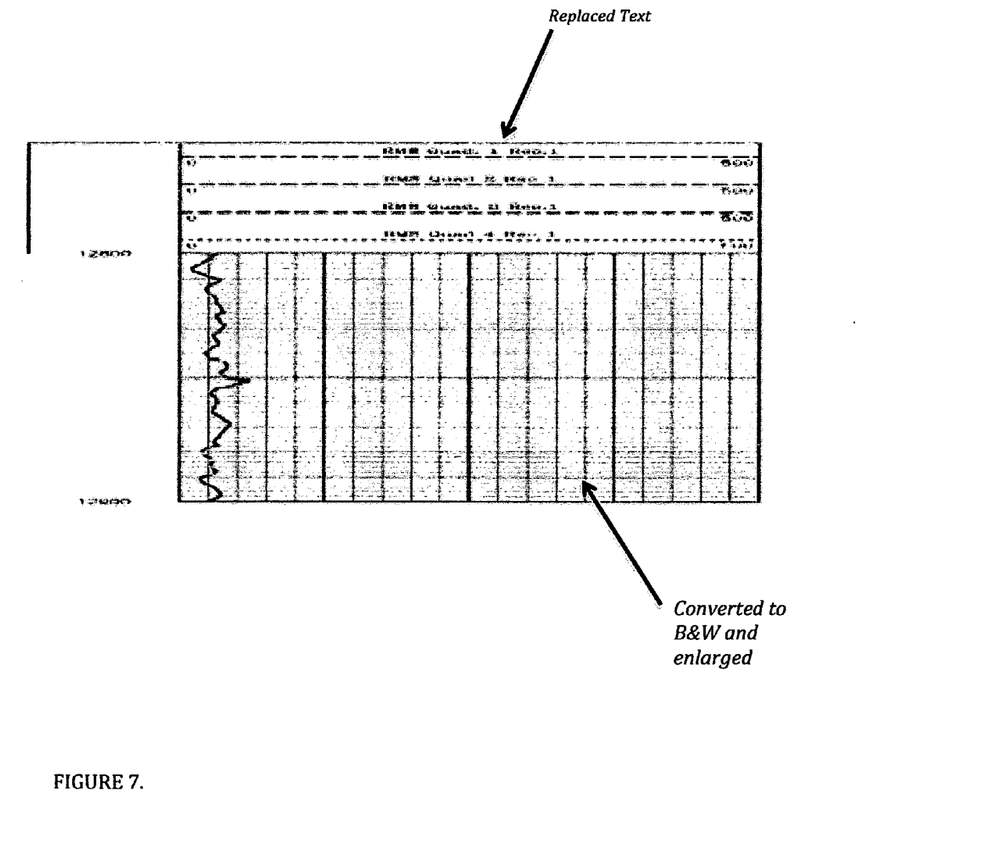
FIG. 7 illustrates normalized RMS energy from receivers in Quadrants 1-4, in accordance with the embodiment of the present invention.

FIG. 6 shows the waveform data from four separate quadrants. The monopole pulse sends at least four waveforms recorded at the same depth, but 90 degrees, or orthogonal, from one another. The Root Mean Square (RMS) should be calculated for each of these monopole waveforms as shown below. FIG. 6 shows the RMS energy output from four orthogonal waveforms overlaying one another. However, the RMS energy output is clearly mismatched, in this example and in most data sets received, so the RMS energy should be normalized or averaged. FIG. 7 shows the data after normalization.

RMS energy can be computed as shown:

RMS Computation
(my $i = $start_col; $i <= $end_col; $i++) {

-continued

```
        $sum2 += $line[$i] * $line[$i];
    }
    my $average = $sum2 / $NPTS;
    my $rms_value = sqrt($average);
Azimuth and RMS using Modified Alford
$sum2 = 0;
        for (my $i=0; $i < $npts; $i++) {
            my $radian = deg2rad($theta);
            my $cos2theta = 2*(cos($radian)*cos($radian))-1;
            my $sin2theta = 2*sin($radian)*cos($radian);
            my $costh_sinth = cos($radian) * sin($radian);
            my $xx = int(-$xx_data[$i] * $sin2theta +
                $yy_data[$i] * $sin2theta +
                $xy_data[$i] * $cos2theta+
                $yx_data[$i] * $cos2theta);
            my $yy = int($xx_data[$i] * $sin2theta -
                $yy_data[$i] * $sin2theta -
                $xy_data[$i] * $cos2theta -
                $yx_data[$i] * $cos2theta);
            my $xy = int(- $xx_data[$i] * $costh_sinth +
                $yy_data[$i] * $costh_sinth -
                $xy_data[$i] * $sin2theta +
                $yx_data[$i] * $cos2theta);
            my $yx = int(- $xx_data[$i] * $costh_sinth +
                $yy_data[$i] * $costh_sinth +
                $xy_data[$i] * $cos2theta -
                $yx_data[$i] * $sin2theta);
            #
            # Compute RMS amplitude for this rotated time-series and
            #
            $sum2 += $yy*$yy +$xx*$xx+$xy*$xy+$yx*$yx;
```

Four time series to be combined and rotated are: XX, XY, YY and YX

Figure 8:
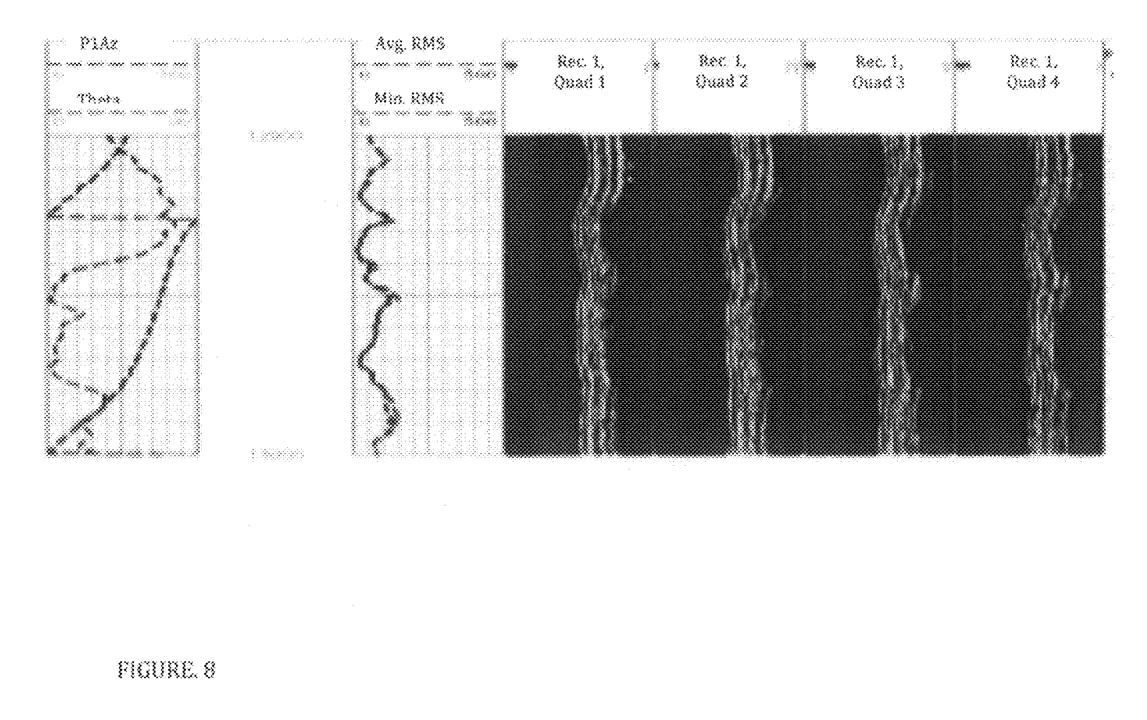
FIG. 8 illustrates a homogenous interval on right side and a non-homogenous interval on left side, in accordance with the embodiment of the present invention.

From the normalized RMS energy output, the particularly important data points are the minimum RMS energy found and the angle at which that minimum is found. The minimum should demonstrate where the fracture exists if there is a fracture present. The angle at which the minimum is found demonstrates the azimuth, or angle, of the fracture. The RMS energy minimum and the angle of the normalized data, then, provide information for where and in which direction to drill for hydrocarbon extraction. If there is no fracture present, then the difference between the minimum and the normalized data will be negligible. When there is a fracture, however, there will be a significant difference shown. In FIG. 8, on the right, there is an example of a homogenous interval, an interval where there is no fracture, and on the left, there is an example of a non-homogenous interval, an interval where there is a fracture. FIG. 8 shows the sharp drop in energy that can be seen in the presence of a fracture with the dotted blue line near 12,900 feet.

Figure 9:
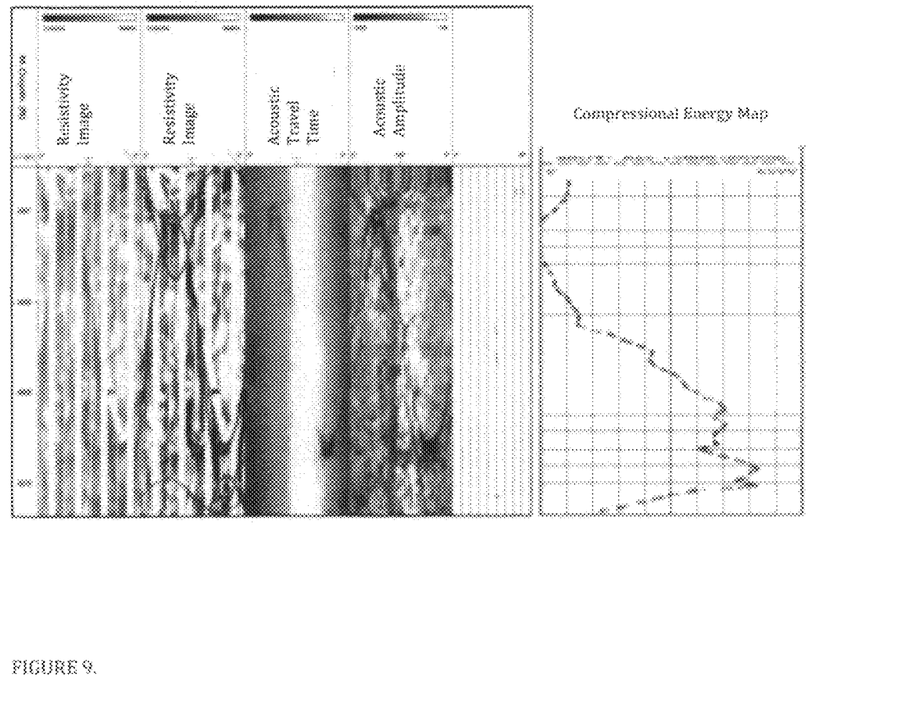
FIG. 9 illustrates comparison of sonic image of a seismic fracture on the left to the normalized RMS compression wave data on the right, in accordance with the embodiment of the present invention.
Figure 10:
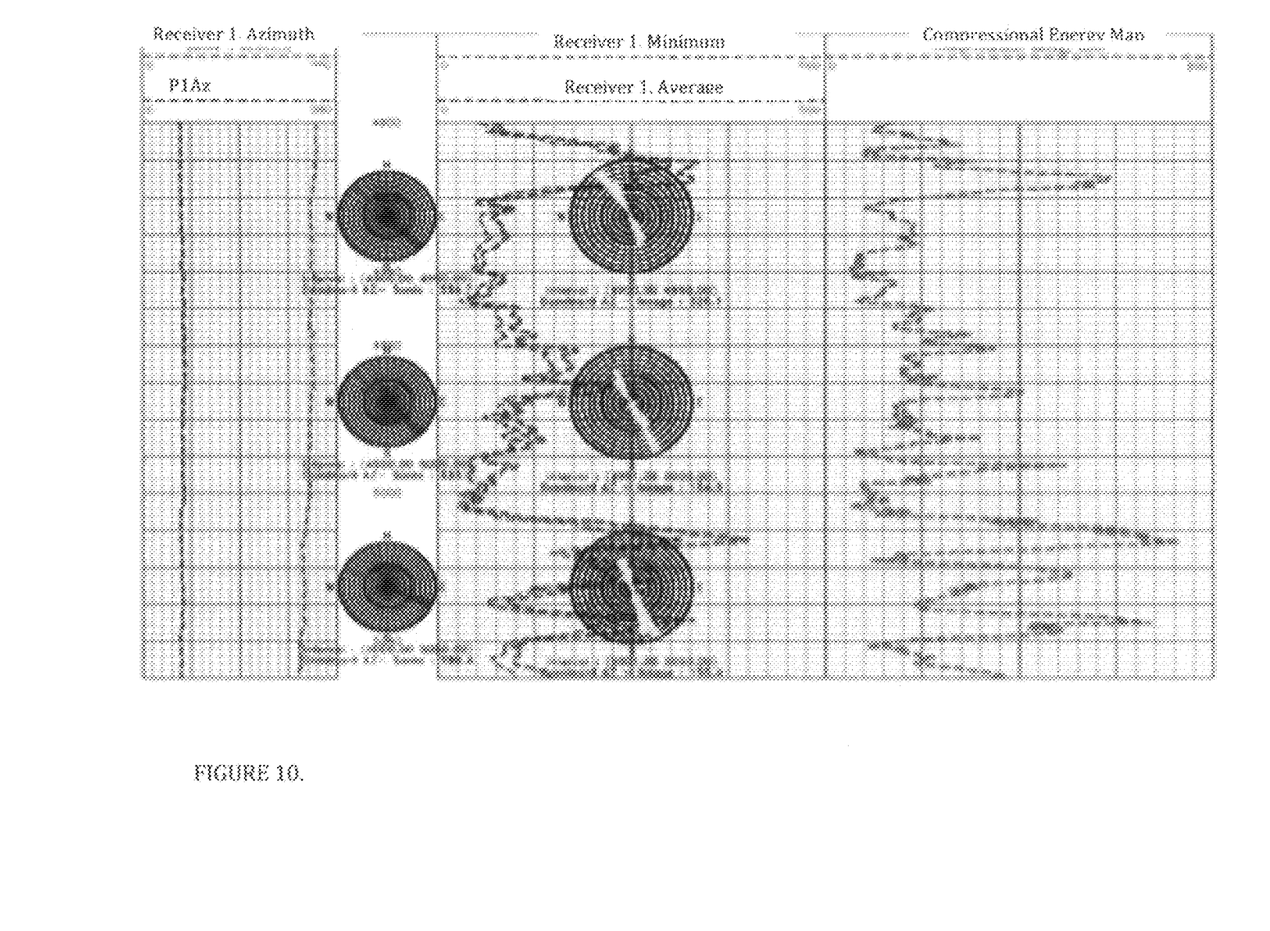
FIG. 10 illustrates fracture detection from P-waves Azimuth Comparison with Image, in accordance with the embodiment of the present invention.

For certain subterranean formations, sonic imaging tools are used in addition to or instead of collecting acoustic wave data. FIG. 9 shows a sonic image of a subterranean formation with a fracture compared to an energy map using the present disclosure's process. There is a drop in RMS energy that coincides with the fracture shown in the image. The fractures seen by the sonic images, therefore, can also be seen by the present disclosure's processing method. Furthermore, there is a higher density of anisotropic formations seen by the present disclosure than comparable methods.

Figure 11:
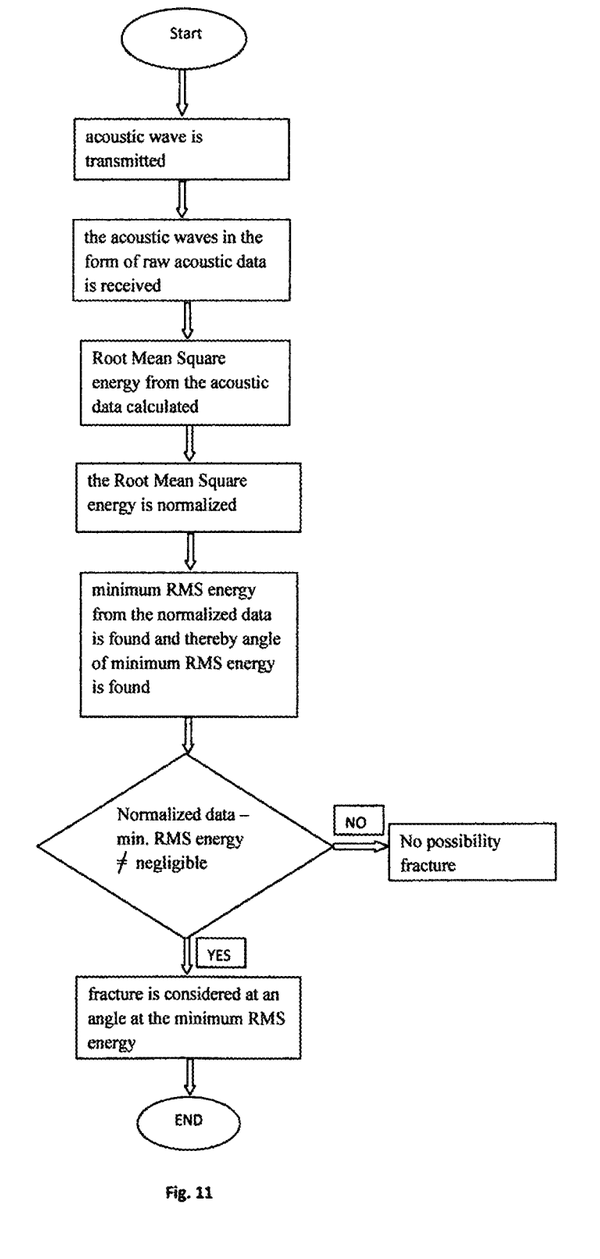
FIG. 11 illustrates steps of determining anisotropic characteristics in subterranean formations, in accordance with the embodiment of the present invention.

FIG. 11 describes the method for determining anisotropic characteristics in subterranean formations in a borehole At S1 the process starts;
At S2 raw monopole acoustic data from a tool is filtered;
At S3 the Root Mean Square energy is calculated from the filtered raw acoustic data;
At S4 the Root Mean Square energy that has been calculated is normalized;
At S5 at least one minimum is found in the normalized Root Mean Square energy;
At S6 the minimum or minimums are compared to the baseline or average normalized Root Mean Square energy for a not negligible difference to identify the existence of fracture or fractures;
At S7 the angle of the minimum or minimums is identified to determine fracture characteristics; and
At S8 the process ends.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure. For example, an alternative embodiment of the current disclosure may also be a computer program with automates the above processing steps.

Increasing the accuracy of the current processing technology would allow corporations to extract the same amount of hydrocarbon as current operations allow from a smaller area, thereby lowering the cost of hydrocarbon extraction. Furthermore, extraction from a smaller area would require fewer chemicals and less potential for leaking those chemicals into groundwater of populated areas. The capability of streamlining and reducing the impact of hydrocarbon extraction would provide leverage in environmental, societal, and political discussions.

Providing a process that is more sensitive to anisotropic formations and that can be used on softer subterranean formations, would enlarge the scope of acoustic processing capabilities. Enlarging the scope of processing capabilities while also increasing the accuracy of that processing would provide more information on which direction to direct extraction operations and on how large of an area to direct extraction operations.

An example of a method for determining fracture patterns and characteristics in subterranean formations is described. The transmission and receipt of acoustic waves, though necessary, happens prior to the first step of the current method. Specific tools already used for hydrocarbon extraction provide the raw acoustic data by transmitting and collecting the said raw acoustic data. The present disclosure can take advantage of said existing tools and provides a new method for interpreting and processing the raw data collected. The raw acoustic data can first be filtered to eliminate data that does not ensure an accurate sample. A Root Mean Square energy from the acoustic data is calculated and normalized. A minimum Root Mean Square energy from the normalized data is identified and the angle of the minimum RMS energy is also noted.

Preferred embodiments are described herein, including the best mode known to the inventor. Of course, variations of those preferred embodiments will become apparent to those of ordinary skill in the art upon reading the foregoing description. The inventor expects skilled artisans to employ such variations as appropriate. Moreover, any combination of the above-described elements in all possible variations thereof is encompassed unless otherwise indicated herein or otherwise clearly contradicted by context.

What is claimed is:

1. A method of locating azimuthal directions of subterranean fractures in a borehole, the method comprising the steps of:

receiving raw acoustic data obtained from a plurality of sensors which are configured to sense acoustic waves corresponding to a depth location within a borehole, the received raw acoustic data corresponding to sensed acoustic waves transmitted from a monopole source through a subterranean formation and oriented in at least four azimuthal directions;

filtering the received raw acoustic data corresponding to the at least four azimuthal directions;

calculating Root Mean Square energies from the filtered raw acoustic data corresponding to the at least four azimuthal directions;

determining a baseline Root Mean Square energy from the calculated Root Mean Square energies; and finding a minimum calculated Root Mean Square energy from the calculated Root Mean Square energies, the minimum calculated Root Mean Square energy associated with a specific azimuthal direction.

2. The method of claim 1, having operations that further comprise:

comparing the calculated Root Mean Square energies with the determined baseline Root Mean Square energy to calculate an energy differential.

3. The method of claim 2, having operations that further comprise:

determining the location of a fracture based upon the calculated energy differential exceeding a predetermined threshold.

4. The method of claim 3, wherein filtering the received raw acoustic data comprises filtering the received raw received data in a time domain.

5. The method of claim 3, wherein filtering the received raw acoustic data comprises filtering the received raw received data in a frequency domain.

6. The method of claim 3, having operations that further comprise:

normalizing the filtered raw acoustic data.

7. A Computer Program Product (CPP) for locating depth locations and azimuthal directions of subterranean fractures in a borehole, the CPP executable by a processor and tangibly embodied in a computer readable medium and containing instructions that, when executed by the processor, cause the processor to perform operations to locate fractures in a subterranean formation, the operations comprising:

receiving raw acoustic data obtained from a plurality of sensors which are configured to sense acoustic waves corresponding to a depth location within a borehole, the received raw acoustic data corresponding to sensed acoustic waves transmitted from a source along a subterranean formation and oriented in at least four azimuthal directions;

filtering the received raw acoustic data corresponding to the at least four azimuthal directions;

calculating Root Mean Square energies from the filtered raw acoustic data corresponding to the at least four azimuthal directions;

determining a baseline Root Mean Square energy from the calculated Root Mean Square energies; and finding a minimum calculated Root Mean Square energy from the calculated Root Mean Square energies, the minimum calculated Root Mean Square energy associated with a specific azimuthal direction.

8. The CPP of claim 7, having operations that further comprise:

comparing the calculated Root Mean Square energies with the determined baseline Root Mean Square energy to calculate an energy differential.

9. The CPP of claim 8, having operations that further comprise:

determining the location of a fracture based upon the calculated energy differential exceeding a predetermined threshold.

10. The CPP of claim 9, wherein filtering the received raw acoustic data comprises filtering the received raw received data in a time domain.

11. The CPP of claim 9, wherein filtering the received raw acoustic data comprises filtering the received raw received data in a frequency domain.

12. The CPP of claim 9, having operations that further comprise:

normalizing the filtered raw acoustic data.

13. A system for locating depth locations and azimuthal directions of subterranean fractures in a borehole, the fracture locating system comprising:

a plurality of sensors which are configured to sense acoustic waves corresponding to depth locations within a borehole;

a processor;

a plurality of program-memory locations coupled to the processor;

a plurality of data-memory locations coupled to the processor; and a display device configured to be controlled by the processor, wherein the plurality of program-memory locations contains instructions that, when executed by the processor, cause the processor to perform operations comprising:

receiving raw acoustic data obtained from the plurality of sensors, the received raw acoustic data correspond to sensed acoustic waves transmitted from a monopole source through a subterranean formation and oriented in at least four azimuthal directions;

filtering the received raw acoustic data corresponding to the at least four azimuthal directions;

calculating Root Mean Square energies from the filtered raw acoustic data corresponding to the at least four azimuthal directions; and finding a minimum calculated Root Mean Square energy from the calculated Root Mean Square, the minimum calculated Root Mean Square energy associated with a specific azimuthal direction.

14. The system of claim 13, having operations that further comprise:

determining a baseline Root Mean Square energy from the calculated Root Mean Square energies.

15. The method of claim 14, having operations that further comprise:

comparing the calculated Root Mean Square energies with the determined baseline Root Mean Square energy to calculate an energy differential.

16. The method of claim 15, having operations that further comprise:

determining the location of a fracture based upon the calculated energy differential exceeding a predetermined threshold.

17. The system of claim 16, wherein filtering the received raw acoustic data comprises filtering the received raw received data in a time domain.

18. The system of claim 16, wherein filtering the received raw acoustic data comprises filtering the received raw received data in a frequency domain.

19. The system of claim 16, having operations that further comprise:

normalizing the filtered raw acoustic data.

* * * * *